March 2, 1943.  H. A. HUTCHINS  2,312,552
POWER UNIT
Filed March 18, 1940  3 Sheets-Sheet 1
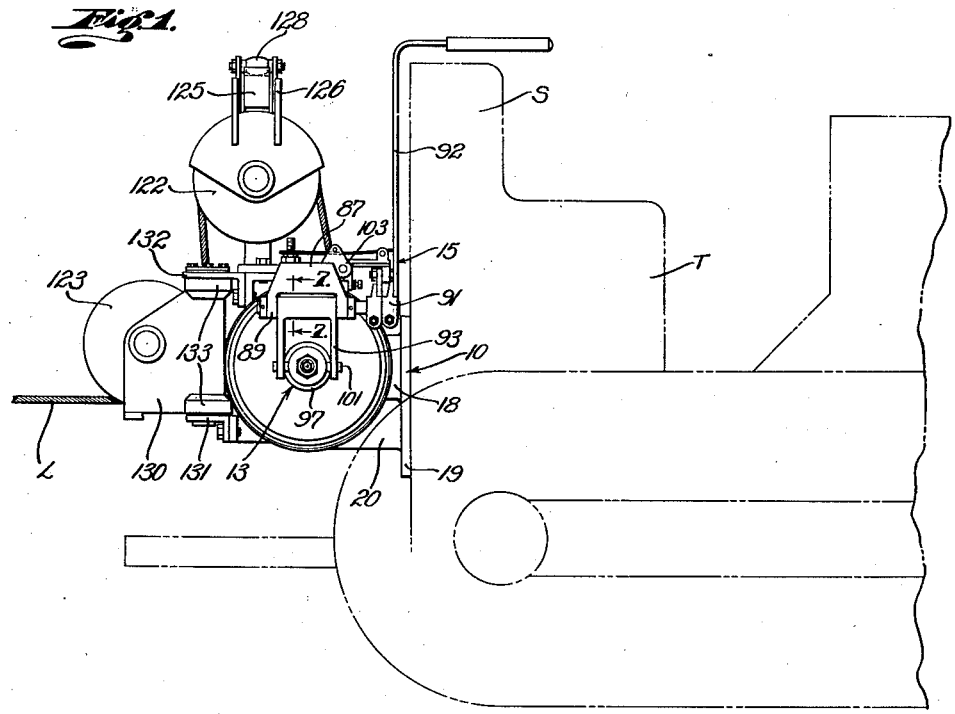
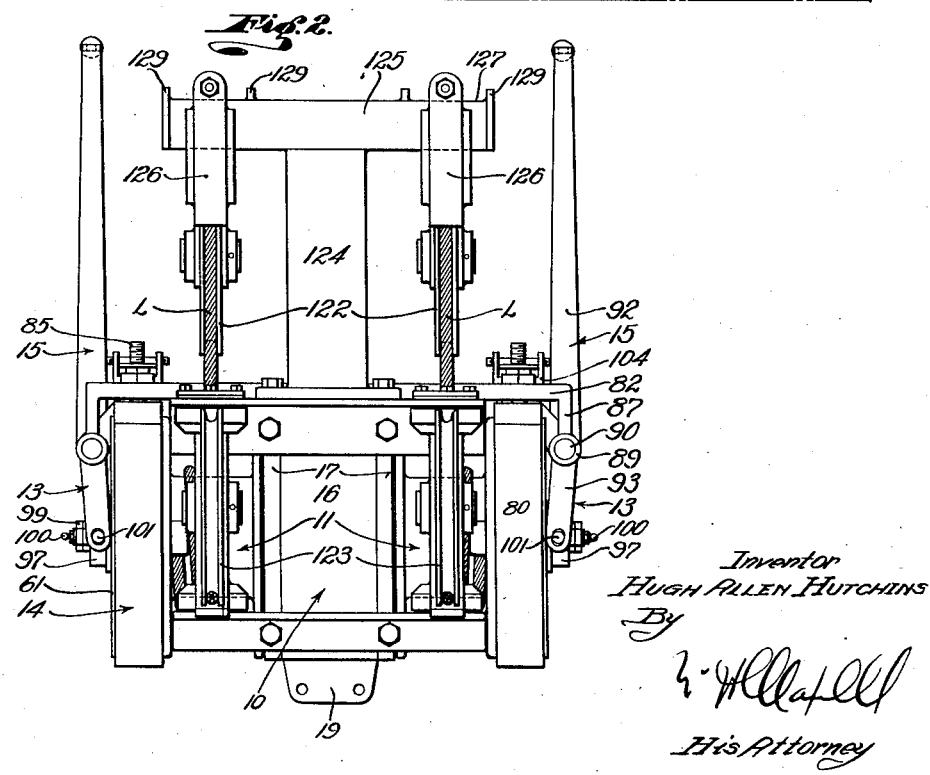
Inventor
HUGH ALLEN HUTCHINS
By
His Attorney

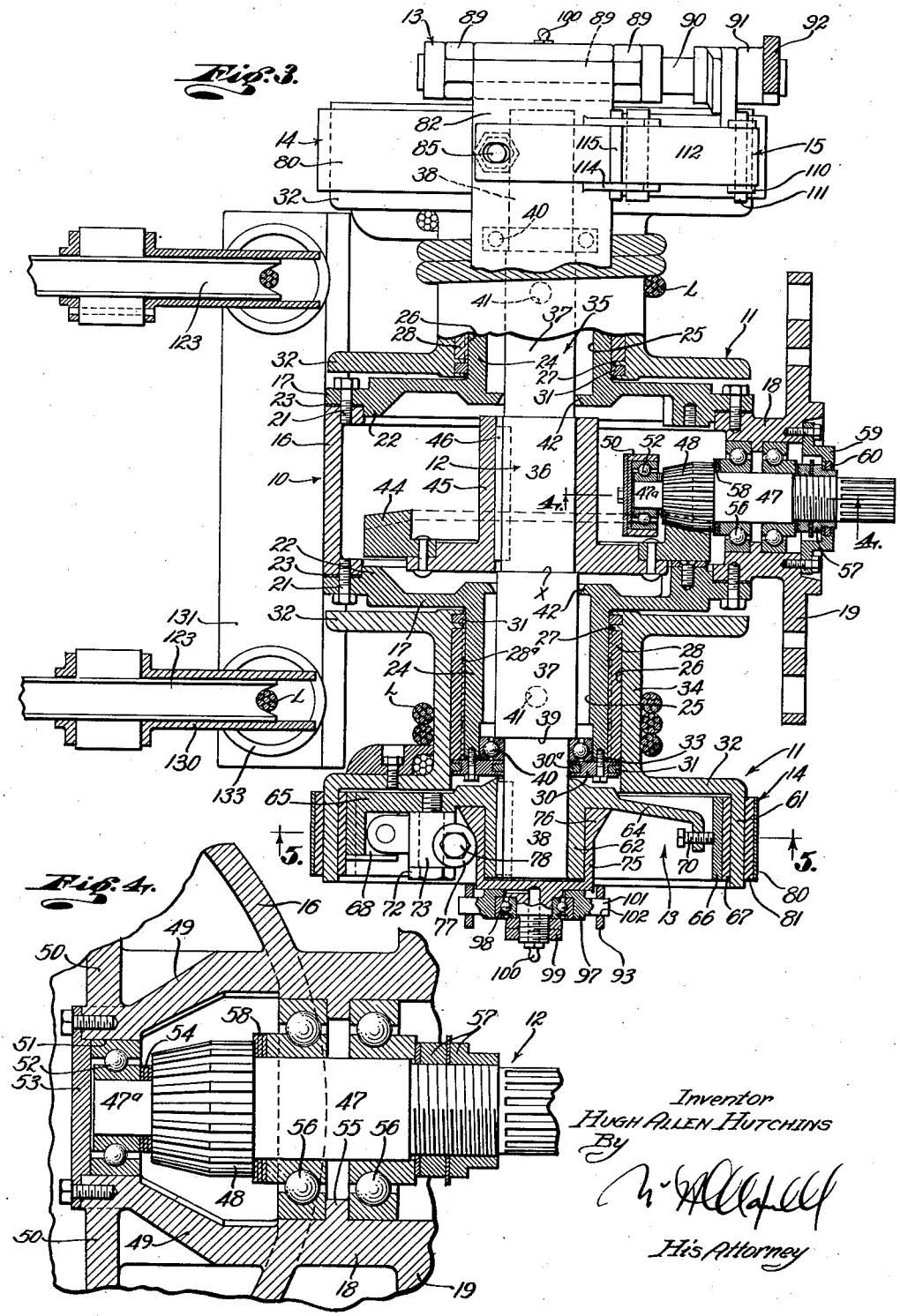

March 2, 1943.    H. A. HUTCHINS    2,312,552
POWER UNIT
Filed March 18, 1940    3 Sheets-Sheet 3
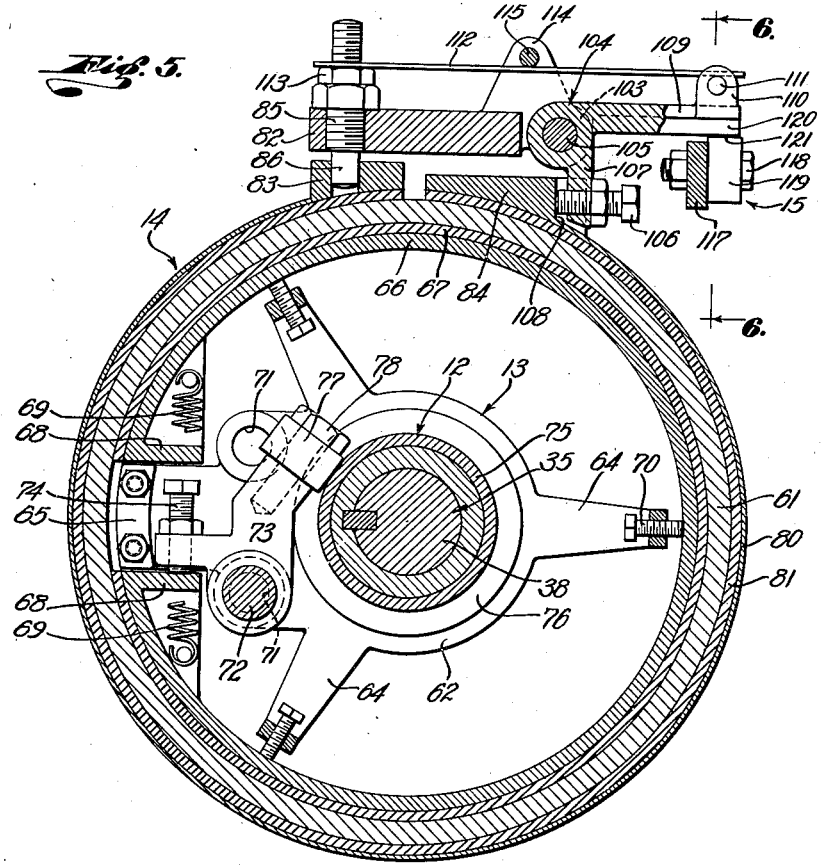
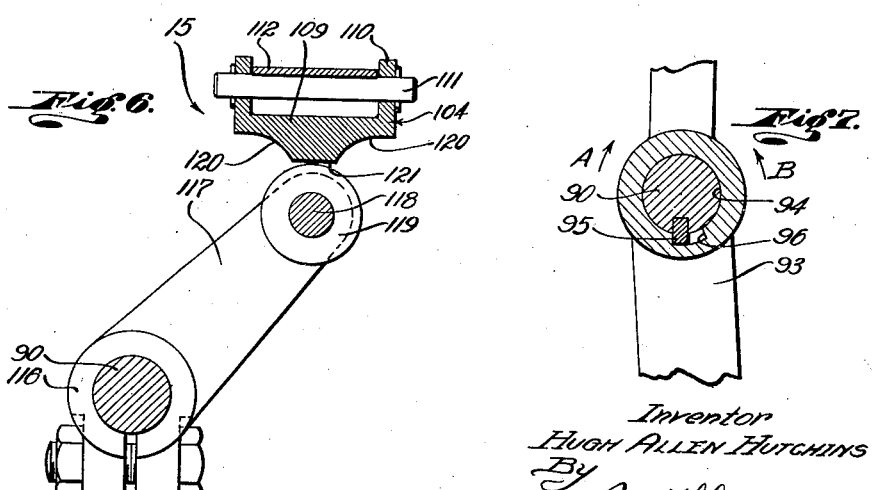
Inventor
Hugh Allen Hutchins
By
His Attorney

//CATCHING & PULLING
IMPLEMENTS.

Patented Mar. 2, 1943

2,312,552

UNITED STATES PATENT OFFICE 2,312,552

POWER UNIT

Hugh Allen Hutchins, Arcadia, Calif.

Application March 18, 1940, Serial No. 324,646

5 Claims. (Cl. 254—185)

This invention relates to line handling attachments for tractors, trucks, etc. and relates more particularly to power take-off attachments or power units attachable to tractors, etc. to operate and control the cables of implements and machinery carried and drawn by the tractors. A general object of this invention is to provide a dependable, effective, and inexpensive power unit of this character.

Another object of this invention is to provide a unit of the character mentioned having two winding drums, a single shaft operating the two drums, and novel means supporting the shaft necessitating only two simple, sturdy bearings. The shaft of the improved power unit is entirely, yet dependably, supported by only two bearings, greatly reducing the machine work, simplifying the general construction, and permitting minor misalignments, distortions, etc. which might otherwise interfere with the operation or cause excessive wear.

Another object of this invention is to provide a power unit of the character mentioned in which the bearings for the drum shaft are positioned adjacent the ends of the shaft leaving a substantial portion of the shaft that does not require machining or fitting.

Another object of this invention is to provide a power unit of the character mentioned embodying novel clutch means for the drums operable by pulling action instead of a pushing motion, and subjecting the shaft to little or no end thrust.

Another object of this invention is to provide a power unit of the character mentioned embodying an efficient brake and clutch operating mechanism requiring a minimum range of movement of the manual control lever for the full control and operation of the clutch and brake.

Another object of this invention is to provide a power unit embodying a novel bearing support for the driving pinion that materially simplifies the housing structure and assures the dependable support of the pinion.

A further object of this invention is to provide a power unit that is adaptable for attachment to all makes and types of tractors and that is suitable for use on tractors and the like whose shafts are rotated in either direction.

The various objects and features of my invention will be fully understood from the following detailed description of a typical, preferred form and application of the invention, throughout which description reference is made to the accompanying drawings, in which:

Fig. 1 is a side elevation of the improved power unit of the invention attached to the rear end of a typical tractor, the tractor outline appearing in broken lines. Fig. 2 is an enlarged rear view of the unit. Fig. 3 is an enlarged horizontal detailed sectional view of the unit with one end portion in plan elevation. Fig. 4 is an enlarged fragmentary vertical detailed sectional view taken as indicated by line 4—4 on Fig. 3. Fig. 5 is an enlarged vertical detailed sectional view taken as indicated by line 5—5 on Fig. 3. Fig. 6 is an enlarged vertical detailed sectional view taken as indicated by line 6—6 on Fig. 5, and Fig. 7 is a fragmentary vertical detailed sectional view taken as indicated by line 7—7 on Fig. 1.

The power unit of the present invention may be said to comprise, generally, a housing 10, a pair of rotatable drums 11 carried by the housing 10, a drive 12 for rotating the drums, clutches 13 for connecting the drums 11 with the drive 12, brakes 14 for the drums 11 and control means 15 for the clutches 13 and brakes 14.

The housing 10 is attachable to the tractor T and serves to mount the drums 10 and contain the drive 12. The housing 10 includes a central section 16 and end members 17 closing the opposite ends of the section 16. The section 16 is a tubular, generally cylindrical member provided at its forward side with a tubular boss 18. The boss 18 projects horizontally from the main housing section 16 and is provided at its forward end with lateral flanges 19 adapted to be bolted or otherwise secured to the rear portion of the tractor T to secure the unit in place. Webs 20 may extend from the upper and lower portions of the section 16 to the flanges 19 to reinforce the construction (see Fig. 1). The end members 17 of the housing 10 are plate-like parts secured to the opposite ends of the tubular housing section 16 by screws 21. Centering rims 22 on the inner sides of the members 17 engage in the section 16 to locate the end members. Sealing gaskets and shims 23 are arranged between the surfaces of the section 16 and the end members 17. By properly shimming the end members 17 the drums 11 may be accurately set and centered, as will be later apparent. Central horizontal stems or bearing extensions 24 project outwardly from the end members 17. The extensions 24 are tubular having central longitudinal openings 25. The stems or extensions 24 are integral with the members 17.

The drums 11 are provided to handle or reel the lines L. The drums 11 may be identical and are supported in aligned relation on the oppositely projecting extensions 24. As illustrated the drums 11 are tubular having openings 26 receiving the extensions 24 with considerable clearance. Anti-friction bushings 28 rotatably mount the drums 11 on their extensions 24. The bushings 28 are pressed into the openings 26 of the drums 11. The inner ends of the bushings 28 engage flanges 27 at the inner ends of the drums 11. Rings 30 are attached to the outer ends of the extensions and engage the outer ends of the bushings 28. Lubricant retainers 31 are set in the flanges 27 and rings 30. Lubricant grooves 28ª are formed in the internal surfaces of the bushings 28. The bushings 28 are lubricated by means to be later described. Each drum 11 has spaced annular radial end flanges 32 defining the line carrying portions of the drum. It will be observed that the drums 11 are supported so that their inner ends are immediately adjacent the body of the housing 10 to be in close relation to the central longitudinal axis of the tractor and the tractor shaft.

The drive 12 for the drums 11 embodies important features of the invention. The drive 12 operates to rotate the two drums 11 through the medium of the clutches 13 and includes a single shaft 35 extending horizontally through the housing 10 and the housing extensions 24 in transverse relation to the drive shaft of the tractor T. In accordance with the invention the shaft 35 is heavy or large in diameter and is stepped or graduated in diameter, having a central portion 36, intermediate portions 37 and end portions 38 of reduced diameter. The central portion 36 of the shaft 35 is within the housing section 16, intermediate shaft portions 37 extend outwardly in the extensions 24 and the reduced end portions 38 project beyond the ends of the extensions 24. One intermediate shaft portion 37 is larger in diameter than the central portion 36 providing a substantial shoulder X on the shaft 35 while the other portion 37 is slightly smaller in diameter than the central portion 36. It is a feature of the invention that the shaft portions 37 do not bear or engage in any parts of the housing structure and do not require bearings and do not have to be accurately machined or finished. The long, intermediate portions 37 of the shaft 35 pass through the extensions 24 with considerable clearance.

Simple and very effective bearing means is provided for rotatably mounting the shaft 35. This means comprises only two anti-friction bearings 40, the heavy shaft requiring only two advantageously placed bearings. A bearing 40 is arranged on each reduced shaft portion 38 to engage inwardly against the shoulders 39 occurring at the outer ends of the shaft portions 37. The bearings 40 are between the rings 30 and the annular shoulders 39. The bearings 40 may be of any selected type or class capable of transmitting both end thrusts and radial thrusts. Shims 33 are arranged behind the rings 30 and the bearings 40 have limited movement relative to the extensions 24 whereby the shaft 35 may be adjusted longitudinally. Novel means are provided to lubricate the bushings 28 and the bearings 40. Internal lips 42 are provided at the inner ends of the openings 25 and receive or pass the shaft 35 with slight clearance. The interiors of the lips 42 flare toward the interior of the housing 10, while the outer sides of the lips are abrupt. The lubricant in the housing 10 may work or splash through the lips 42 into the openings 25 but the lips serve to prevent the return of the lubricant. The lubricant thus supplied to the openings 25 fully lubricates the bearings 40. The rings 30 have lubricant retainers 30ª engaging about the shaft 35. Radial openings 41 are formed in the lower parts of the extensions 24, and the lubricant passes through these openings to the bushings 28 to be picked up by the grooves 28ª. The lubricant from the housing 10 serves to lubricate both the shaft bearings 40 and the drum bushings 28. It will be observed that the shaft 35 is fully supported by the spaced bearings 40 adjacent its ends while the major portion of the shaft is free and permitted to float.

The drive 12 further includes a ring gear 44 removably secured on the central portion 36 of the shaft 35. The ring gear 44 has a hub 45 surrounding the shaft portion 36 and secured thereto by a key 46. The opposite ends of the gear hub 45 occur at the ends of the shaft portion 36 so that the hub seats against the shoulder X. The ring gear 44 is mounted on one end of the hub 45 and faces inwardly. A driving shaft 47 extends inwardly through the housing boss 18. The forward projecting end of the shaft 47 is formed to be conveniently coupled with the tractor shaft (not shown). A pinion 48 is keyed or otherwise secured to the shaft 47 to mesh with the gear 44.

Novel and very effective means is provided for supporting the pinion 48 and its shaft 47. Rearwardly and inwardly converging webs 49 project from the inner wall of the body section 16 above and below the shaft 47 and join a transverse web part 50. This structure is best illustrated in Fig. 4 of the drawings. A horizontal opening 51 is formed in the web part 50 and carries an anti-friction bearing 52. A plate 53 is secured to the web part 50 to hold the bearing 52 against displacement from the opening 51. The anti-friction bearing 52 receives and supports a reduced end portion 47ª of the pinion shaft 47. Shims 54 are arranged between the inner end of the pinion 48 and the bearing 52. It will be noted that the pinion supporting bearing 52 is dependably supported by the web structure 49—50. The interior of the boss 18 has an annular flange 55 and anti-friction bearings 56 are seated in the boss at opposite sides of the flange 55 to rotatably support the pinion shaft 47. Nuts 57 provided with lubricant retaining washers are threaded on the shaft 47 to cooperate with the outer bearing 56. Shims 58 are provided on the shaft 47 between the inner bearing 56 and the pinion 48. Proper adjustment of the shims 54 and 58 assures the correct meshing of the pinion 48 with the gear 44. The shaft 47 is supported by the anti-friction bearings 52 and 56 at opposite sides of the pinion 48 to be supported against all thrusts. A ring 59 is attached to the forward side of the boss 18 and carries a lubricant retaining packing ring 60 which engages about the outer nut 57.

The clutches 13 are operable to engage or connect the winding drums 11 with the shaft 35 so that the drums may be selectively driven or rotated at the will of the operator. The two clutches 13 are preferably identical and each includes an axially projecting annular flange or drum 61 on the outer flange 32 of the related winding drum 11. The drums 61 form the flanges or drums of the brakes 14 as will be later described. Spiders 62 are secured to the reduced end portions 38 of the shaft 35 to operate or turn in the drums 61. The spiders 62 may be keyed to the shaft portions 38 and include spaced radiating arms 64 and a radiating broadened part 65. A flexible clutch ring 66 is arranged within the drum 61 of each clutch 13 and carries friction material or lining 67 for cooperating with the internal surface of the surrounding drum 61. The rings are each open at one side and have inturned hollow or recessed lugs 68 where they are broken or open. The broadened parts 65 of the spiders 62 are received between the lugs 68 with suitable clearance. Tension springs 69 are connected between the spaced lugs 68 to normally contract the clutch rings 66 so that the friction linings 67 are free of the drums 61. The radiating arms 64 of the spiders 62 have adjustable screws 70 for contacting the interiors of the rings 66 to equalize the forces on the rings.

The broadened spider parts 65 have openings 71 carrying axially projecting pins 72. There may be two openings 71 in each spider part 65 to make the spiders adaptable for embodiment in either of the clutches 13. However, as illustrated, only one pin 72 is employed in each clutch. Bell cranks 73 are pivotally carried by the pins 72 and project outwardly to be received between the adjacent lugs 68. Adjustable screws 74 are threaded through openings in the bell cranks 73 and are cooperable with the adjacent lugs 68 to expand the rings 66 and thus bring the friction material 67 into cooperation with the drums 61. By arranging the pins 72 in appropriate openings 71 the bell cranks 73 may expand the clutch rings 66 in such a manner that the clutches 13 are self-energized through the engagement of their linings 66 with the drums 61.

The clutches 13 further include sleeves or cups 75 on the hubs of the spiders 62. The outer parts of the cups 75 are cylindrical while the inner portions of the cups are pitched to constitute cones 76. Each bell crank 73 carries a roller 77 for cooperating with the related cone 76. The rollers 77 may be supported by pins 78 suitably secured to the bell cranks 73. The parts are related so that the rollers 77 normally cooperate with the cylindrical parts of the cups 75 adjacent the cones 76. Upon outward axial shifting of a cup 75 its cone 76 cooperates with the related roller 77 to pivot the bell crank 73 and cause spreading of the related clutch ring 66. It will be observed that the clutches 13 are engaged or put into operation by outward shifting of their cups 75 and that actuation of the clutches places no end thrust on the shaft 35.

The brakes 14 serve to normally hold the winding drums 11 against rotation and are releasable to permit free spooling of the drums and rotation of the drums through engagement of the related clutches 13. The brakes 14 include suitable flexible bands 80 arranged around the drums 61 and provided on their inner sides with linings 81 of friction material. A substantially horizontal plate 82 is secured to the top of the housing 10 and projects beyond the ends of the housing to overhang the brakes 14. One end of each brake band 80 is anchored to the plate 82. Lugs 83 and 84 are fixed to the ends of the brake bands 80. Pins or studs 85 are threaded or otherwise fixed in openings in the plate 82 and have lower end portions 86 received in openings in the lugs 83 to anchor the brake bands 80. The anchored ends of the brake bands 80 are so related to the direction of rotation of the drums 11 that the bands tighten or wrap themselves onto the drums 61 when their free ends are moved toward the brake drums.

The operating means or controls 15 are separately operable by the driver of the tractor to release the brakes 14 and engage the related clutches 13, or to set the brakes 14 and release the related clutches 15, or to free both the brakes 14 and the related clutches 13.

A control means 15 is provided to control or operate the clutch 13 and the brake 14 of each drum 11 and the two controls are alike or identical. Each control 15 includes a depending skirt 87 on the end of the plate 82 and spaced bearings 89 on the lower end of the skirt. Horizontal shafts 90 are turnably carried by the bearings 89. The shafts 90 project forwardly beyond the front bearings 89 and clamps 91 are rigidly secured to the projecting portions of the shafts (see Fig. 1). Levers 92 are fixed to the clamps 91 and extend upwardly and then forwardly to have their handles adjacent the opposite sides of the driver's seat S of the tractor T. A shifting fork 93 is carried by each shaft 90 for the control of the related clutch 13. The forks 93 are mounted on the shafts 90 between the spaced bearings 89 having openings 94 passing or receiving the shafts. Keys 95 are set or fixed in the shafts 90 and are received in keyways or grooves 96 in the walls of the openings 94 (see Fig. 7). The width of the grooves 96 is considerably greater than the width or thickness of the keys 95 permitting limited relative movement between the shafts 90 and the forks 93. The loose or slack fit of the keys 95 in the grooves 96 is such that the shafts 90 may be turned some distance before causing movement of the forks 93, thus permitting initial independent control of the brakes 14 during certain phases of operation.

The forks 93 are operatively connected with the cups 75 of the related clutches 13. The connections between the shifting forks and the cups 75 include rings 97 rotatably supported on the reduced outer ends of the cups 75 by suitable anti-friction bearings 98. Nuts 99 secure the bearings 98 to the cups 75. Lubricant fittings 100 may be provided on the outer ends of the cups 75 to facilitate the lubrication of the bearings 98. The rings 97 have diametrically opposite pins 101 received in openings 102 in the lower portions of the forks 93. It will be seen that swinging or pivoting of the forks 93 results in axial shifting of the associated clutch cups 75.

The control means 15 further include novel brake actuating and controlling mechanisms. The end portions of the plate 82 are provided with projecting yokes 103 and bell cranks 104 are received in the yokes (see Fig. 5). Horizontal pivot pins 105 support the bell cranks 104 in the yokes 103. The bell cranks 104 have depending fingers 107 provided with adjustable screws 106. The fingers 107 are received in notches 108 in the adjacent brake band lugs 84 and the screws 106 project from the fingers to engage the lugs. The engagement of the fingers 107 in the notches 108 holds the brake band 80 against lateral shifting and displacement. The bell cranks are further provided with forwardly projecting fingers 109 provided at their upper sides with spaced posts 110. Horizontal rods 111 are supported by the posts 110. Novel spring means are provided to initiate energization or operation of the brakes 14. Leaf springs 112 are arranged to have their forward ends bear downwardly on the rods 111 and to have their rear parts bear downwardly on adjustable nuts 113 threaded on the screws or studs 85. Pairs of lugs 114 are provided on the plate 82 and support horizontal rods 115. The rods 115 engage the upper sides of the springs 112 at points substantially midway between the rods 111 and the nuts 113. The springs 112 bearing downwardly on the rods 111 operate to yieldingly urge the bell crank 104 downwardly so that the screws 103 bear against the lugs 84 to actuate or contract the brake band 80. By adjusting the nuts 113 the pressure exerted by the springs 112 may be varied or regulated.

The brake controlling and operating mechanisms further include collars 116 clamped on the forward projecting parts of the shafts 90 and provided with upwardly projecting arms 117 (see Fig. 6). Pins 118 on the upper parts of the arms 117 carry rotatable rollers 119. The under sides of the bell crank arms 109 are formed to cooperate with the rollers 119. Longitudinal grooves 120 formed with concave walls are provided in the under sides of the bell crank fingers 109. While the adjacent roller 119 is cooperable with only one groove 120 it is preferred to form two spaced grooves 120 in the under side of each finger 109 so that the bell cranks 104 are suitable for embodiment in either of the brake controlling mechanisms. Horizontal flats or lands 121 occur on the under sides of the fingers 109 between the spaced grooves 120. Upon turning of a shaft 90 the associated roller 119 is moved between a position where it cooperates with a groove 120 and a position where it may cooperate with the land 121. The parts are formed and related so that the cooperation of a roller 119 with a groove 120 holds the bell crank 104 in a position where the brake band 80 is free so that the related winding drum 11 is free to rotate. With the roller 119 at or below the adjacent land 121 the spring 112 holds the related bell crank 104 in a position where the brake band 80 is actuated or contracted so that the winding drum 11 is held against rotation in one direction.

It will be observed that the winding drums 11, the housing members 17, the bearings for the shaft 35, and the drums 11, clutches 13, the brakes 14 and the controls 15 may be identical and may have interchangeable parts, making the construction easy to assemble and providing for the utmost economy in manufacture.

Sheave arrangements or fair leads are provided to assure the correct spooling or reeling of the lines L on the winding drums 11. The fair leads include upper sheaves 122 and lower sheaves 123. A post 124 projects upwardly from the housing 10 or the housing plate 82 and is provided at its upper end with horizontally projecting arms 125. Hangers 126 are secured to the housings of the upper sheaves 122 to suspend the sheaves from the arms 125. Tracks or surfaces 127 are provided on the upper sides of the arms 125 and extend in the same general direction as the longitudinal axes of the winding drums 11. As best illustrated in Fig. 1 of the drawings the post 124 may be offset rearwardly from the vertical plane occupied by the axes of rotation of the drums 11 and the surfaces 127 are likewise offset from the centers of the drums. Rollers 128 are rotatably mounted in the upper parts of the hangers 126 and engage the surfaces 127 to suspend the upper sheaves 122. The rollers 128 present convex or spherical surfaces which ride on the surfaces 127. Stops 129 are provided at the ends of the surfaces 127 to limit rolling movement of the rollers 128. The convex rollers 128 are free to move along the surfaces 127 and to pivot on the surfaces 127. Pivoting of the rollers 128 on the surfaces 127 are limited by the engagement of the hangers 126 with the sides of the arms 125. The lines L pass upwardly from the drums 11 to engage over the sheaves 122 and pass downwardly from the sheaves 122 to the lower sheaves 123. With the parts related as above described the portions of the line extending from the sheaves 122 to the drums 11 and the sheaves 123 may slope upwardly and rearwardly as illustrated in Fig. 1 of the drawings. However, the inclination of the line portions may vary when the load or tension on the lines causes the rollers 128 to move on the surfaces 127 or the sheaves to pivot.

The lower sheaves 123 have suitable housings 130 supported on the power unit to swing about generally vertical axes. The sheaves 123 are mounted behind the drums 11 and below the associated sheaves 122. Suitable brackets 131 and 132 are secured to the housing 10 and antifriction bearings 133 support the sheave housings 130 on the brackets so that the sheaves 123 may freely swing about generally vertical axes in response to changes in the direction taken by the lines L. The upper bearings 133 are tubular and the lines pass downwardly through these bearings and engage under the sheaves 123 so that they may extend outwardly or rearwardly from the unit. When the lines L are reeled onto and from the drums 11 the upper sheaves 122 supported as described above, may move axially of the drums 11, may swing about generally vertical axes, and may move forwardly and rearwardly a limited extent to allow the correct reeling of the lines.

In operation it may be assumed that the main shaft 35 is continuously rotated by the engine or prime mover of the tractor T through the medium of the drive 12. When the drums 11 are idle the parts of the controls 15 are in the positions illustrated in Figs. 5, 6 and 7 where the rollers 119 are at or adjacent the lands 121 and the clutch forks 93 are in their inner positions. The springs 112 act on the bell cranks 104 to urge the screws 105 against the brake band lugs 84 to hold the brakes conditioned. The brakes 14 serve to normally prevent rotation of the drums 11 in the unspooling direction. When it is desired to reel in a line L the selected lever 92 is moved to turn the related shaft 90 in the direction indicated by the arrow A in Fig. 7. The key 95 on the shaft 90 cooperates with the end wall of the groove 96 to pivot the fork 93 outwardly. Outward pivoting of the fork 93 moves the cone 76 against the roller 77 so that the bell crank 73 is pivoted to actuate or engage the clutch 13. The above mentioned turning of the shaft 90 in the direction indicated by the arrow A results in downward swinging of the arm 117 moving the roller 119 away from the bell crank 109. Thus the brake 14 remains conditioned or active when the clutch 13 is engaged to reel in the line L. However, as the brake 14 is of the self-energizing type it offers practically no resistance to rotation of the drum 11 in the line spooling direction. To release the clutch 13 the lever 92 is swung back to return the parts to the positions illustrated in Figs. 5, 6 and 7. This return movement is accompanied by inward swinging of the clutch fork 93 and the spring 69 contracts or releases the clutch ring 66. The brake 14 being of the wrap around or self-energized type immediately becomes effective to hold the drum 11 against rotation in the unspooling or unreeling direction.

If it becomes desirable to allow free unreeling of a line L from a drum 11 the manual lever 92 controlling the drum is moved in a direction to turn the shaft 90 as indicated by the arrow B in Fig. 7. Turning of the shaft 90 in the direction indicated by the arrow B, and from the neutral position illustrated, results in upward movement of the arm 117 and movement of the roller 119 into a groove 120 of the bell crank 104. The engagement of the roller 119 with the bell crank arm 109 pivots the bell crank 104 and moves the screw 106 away from the lug 84. This frees or releases the brake band 80 so that the brake is released. It will be observed that movement of the shaft 90 in the direction indicated by the arrow B to effect release of the brake 14 does not, of necessity, cause movement of the clutch controlling fork 93 as the key 95 may merely move in the groove 96 without causing movement of the fork during the brake releasing operation. With the clutch 13 and the brake 14 released the drum 11 is, of course, free so that the line may be unspooled. To return the parts to the normal condition, the lever 92 is swung back to bring the roller 119 under the land 121 so that the spring 112 forces the screw 106 against the brake band lug 84. The return of the brake 14 to its normal active condition is accompanied by movement of the key 95 to the position illustrated in Fig. 7 where it is engaged with a side of the groove 96 for the immediate clutch engaging movement of the fork 93 when the shaft 90 is subsequently moved in the direction indicated by the arrow A.

The screws 70 and 74 may be adjusted to keep the clutches in proper working order. The screws 106 and the nuts 113 may be adjusted to regulate the brakes 14 and to assure the proper spring pressure on the brake band lugs 84. The main shaft 35 is supported by the two spaced bearings 40 in such a manner that its main portion is free to float. The drive pinion shaft 47 is dependably supported by the bearing 52 and its webs 49. The unit may be readily converted for use with a tractor having a shaft driven in the reverse direction by removing the drum 11 and the associated parts from one housing extension 24 and then disengaging the housing member 17 to make the shaft 35 and gear 44 accessible for removal. If desired the gear 44 may be removed with the shaft 37. The shaft is then turned end for end to turn the gear 44 side for side and the assembly of the shaft and gear is replaced in the housing 10. When the parts are re-assembled the gear 44 meshes with the opposing side of the pinion 48 so that the shaft 35 will be driven in a direction opposite to that in which it was formerly rotated.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In a power take-off attachment for a tractor, or the like, a housing to be attached to the tractor and adapted to contain lubricant, a winding drum at each side of the housing, tubular parts on the housing having communication therewith, bearing means rotatably supporting the drums on said parts, a shaft for driving the drums extending through the housing and passing through said parts with clearance, anti-friction bearings in said parts rotatably supporting the shaft, said parts receiving lubricant from the housing and having openings for delivering lubricant to said bearing means, and means trapping the lubricant in said parts to lubricate said bearings and to pass to said openings, the last named means including internal trap lips on the inner ends of said parts surrounding the shaft with slight clearance.

2. In a power take-off attachment for a tractor or the like, a housing to be secured to the tractor, tubular extensions projecting from opposite sides of the housing, a driven shaft extending through the housing and extensions and rotatably supported in the extensions to project from the ends thereof so that it has free unsupported end portions, winding drums rotatably supported on the extensions, clutch flanges on the outer ends of the drums, expansible friction band means rotatable with the end portions of the shaft, cones shiftable on said end portions of the shaft and having outwardly convergent surfaces for expanding the band means into cooperation with the flanges upon outward movement of the cones relative to their respective drums, and control means for operating the cones.

3. In a power unit attachment having a housing, drums rotatably supported on opposite sides of the housing and a rotating shaft extending through the housing and projecting beyond the outer ends of the drums, the combination of, clutches on the projecting end parts of the shaft for connecting the drums with the shaft, brake flanges on the outer ends of the drums, bands cooperable with the flanges to hold the drums against rotation in one direction, means for anchoring one end of each band, lugs on the other ends of the bands, pivoted bell cranks, a screw on one arm of each bell crank engaging the lug of a brake band, leaf springs acting on other arms of the bell cranks to urge the screws against the lugs, and manually operable elements cooperable with said other arms to relieve the bands of the spring pressure.

4. In a power unit attachment for a tractor, or the like, a housing, drums rotatably supported on opposite sides of the housing, a rotating shaft extending through the housing and projecting beyond the outer ends of the drums, an axial flange on the outer end of each drum, clutches on the projecting ends of the shaft engageable radially outward against the interiors of the flanges to connect the drums with the shaft, clutch actuating members movable axially outward with respect to their respective clutches to actuate the same, brake bands cooperable with the exteriors of the flanges to hold the drums against rotation, a manually turnable shaft adjacent the outer end of each drum, a brake releasing mechanism connected to each manually turnable shaft to be operated thereby, and a slack operating connection between each manually turnable shaft and the adjacent clutch actuating member so that the member is operable by the shaft and whereby the brake releasing mechanism may be operated without affecting the clutch actuating member.

5. In a power unit attachment for a tractor, or the like, a housing, drums rotatably supported on opposite sides of the housing, a rotating shaft extending through the housing and projecting beyond the outer ends of the drums, an axial flange on the outer end of each drum, a clutch on each projecting end of the shaft engageable radially outward against the interior of the flange on the adjacent drum to connect the drum with the shaft, brake bands cooperable with the exteriors of the flanges to hold the drums against rotation, a manually turnable shaft adjacent each drum, a brake releasing mechanism operated by the manually turnable shaft, a clutch controlling mechanism for each clutch each having an opening receiving one of said manually turnable shafts, and a slack connection between each manually turnable shaft and the related clutch controlling mechanism whereby the brake releasing mechanism may be operated without affecting said related clutch controlling mechanism, each slack connection comprising a key on a manually turnable shaft and a groove in the related clutch controlling mechanism of greater width than the key.

HUGH ALLEN HUTCHINS.